(12) United States Patent
Matheisl et al.

(10) Patent No.: US 9,932,206 B2
(45) Date of Patent: Apr. 3, 2018

(54) FASTENING DEVICE FOR FASTENING A PLATE TO TRACTION MEANS

(71) Applicant: Inventio AG, Hergiswil (CH)

(72) Inventors: Michael Matheisl, Vösendorf (AT); Robert Schulz, Vienna (AT); Werner Eidler, Göllersdorf (AT); Thomas Illedits, Neufeld (AT)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 15/314,169

(22) PCT Filed: May 13, 2015

(86) PCT No.: PCT/EP2015/060614
§ 371 (c)(1),
(2) Date: Nov. 28, 2016

(87) PCT Pub. No.: WO2015/180964
PCT Pub. Date: Dec. 3, 2015

(65) Prior Publication Data
US 2017/0197809 A1 Jul. 13, 2017

(30) Foreign Application Priority Data
May 28, 2014 (EP) .................................... 14170277

(51) Int. Cl.
*B66B 21/00* (2006.01)
*B66B 21/02* (2006.01)
(Continued)

(52) U.S. Cl.
CPC ............ *B66B 23/10* (2013.01); *B65G 17/067* (2013.01); *B65G 39/20* (2013.01); *B66B 23/145* (2013.01); *B66B 29/005* (2013.01)

(58) Field of Classification Search
None
See application file for complete search history.

(56) References Cited

U.S. PATENT DOCUMENTS

| 2,059,063 A | 10/1936 | Tourville |
| 3,782,533 A | 1/1974 | Hartwig |

(Continued)

FOREIGN PATENT DOCUMENTS

| CH | 618394 A5 | 7/1980 |
| DE | 1756813 | 9/1970 |

(Continued)

*Primary Examiner* — Kavel Singh
(74) *Attorney, Agent, or Firm* — William J. Clemens; Shumaker, Loop & Kendrick, LLP

(57) ABSTRACT

A plate belt of a moving walkway has plates arranged in succession in a movement direction and between two mutually parallel link chains formed by chain links of different widths. Each chain link is connected with one of the plates by at least one fastening device. The fastening devices include a fastening bolt and a cup washer, wherein the cup washer has a cup base ring and a cup collar encircling the cup base ring. The inner height of the cup collar corresponds with the thickness of at least one chain link strap of the chain link and the inner diameter of the cup collar is greater than the outer diameter of the region of the fastening bolt bearing against the cup base ring in the mounted state.

15 Claims, 3 Drawing Sheets

(51) Int. Cl.
*B66B 23/10* (2006.01)
*B66B 23/14* (2006.01)
*B66B 29/00* (2006.01)
*B65G 17/06* (2006.01)
*B65G 39/20* (2006.01)

(56) References Cited

U.S. PATENT DOCUMENTS

| | | | |
|---|---|---|---|
| 4,244,457 A | 1/1981 | Ernst | |
| 6,474,464 B1 * | 11/2002 | Horton | B65G 17/08 198/850 |
| 6,862,939 B2 * | 3/2005 | Frost | G01M 13/023 73/828 |
| 7,950,515 B2 * | 5/2011 | Gonzalez Alemany | B66B 23/10 198/327 |

FOREIGN PATENT DOCUMENTS

| | | |
|---|---|---|
| JP | 2003226481 A | 8/2003 |
| WO | 9729987 A1 | 8/1997 |

* cited by examiner

FASTENING DEVICE FOR FASTENING A PLATE TO TRACTION MEANS

FIELD

The invention relates to a fastening device for connecting a plate of a moving walkway with a link chain serving as traction means.

BACKGROUND

Moving walkways are generally known and efficient items of equipment for transporting persons. They are typically used for the transport of persons in horizontal direction, but also in vertical direction with a slight inclination up to 12° if, for example, they are to convey users with shopping trolleys from one floor of a building to another floor. The length and width of the moving walkway are selected in dependence on the anticipated passenger traffic for the respective use.

Plates are conceived as integral or multipart components and the parts thereof are usually produced by casting processes, extrusion processes, forging processes and the like. Several plates are usually connected by way of two traction means to form a plate belt of a moving walkway. These traction means are usually link chains. A moving walkway usually comprises a support structure or framework with two deflecting regions between which the plate belt is guided to circulate.

The connection between the link chain and the plate has to be secure and permanent, since loosening of the connection and thus of the plate of the plate belt during operation of the moving walkway can have catastrophic consequences for users.

Different fastening devices for fastening a plate of a moving walkway to a link chain are disclosed in U.S. Pat. No. 4,244,457 A. All these fastening devices have the disadvantages that they are quite complicated to produce and/or mount and after assembly or during operation of the plate belt it is very difficult to check the fastening device for damage or breakage. In particular, fastening devices arranged between the chain links are difficult to mount and in the installed state can hardly be checked or even cannot be checked.

SUMMARY

An object of the present invention is therefore to create a fastening device for connecting a plate with link chains serving as traction means, which device can be simple to mount, can be produced economically and can, in the mounted state or in operation, be checked in simple manner.

This object is fulfilled by a plate belt of a moving walkway with plates which are arranged in succession in movement direction and which are arranged between two mutually parallel link chains formed from chain links of different widths. Each chain link is connected with one of the plates by means of at least one fastening device. The fastening device comprises a fastening bolt and a cup washer, wherein the cup washer has a cup base ring and a cup collar or cup skirt encircling the cup base ring. The inner height of the cup collar corresponds with the thickness of at least one chain link strap of the chain link. In addition, the inner diameter of the cup collar is larger than the outer diameter of the region of the fastening bolt bearing against the cup base ring in the mounted state.

The cup washer makes it possible, by its inner height matched to the thickness of the chain link strap and by its inner diameter matched to the fastening bolt, for the same fastening device to be able to be used between narrow and wide chain links of the link chain and the plates to be fastened thereto. In addition, the use of the cup washer also has the consequence that all parts of the fastening device remain visible and all bolt ends of the fastening bolts of a plate belt protrude to the same extent from the connecting points between link chain and plates. This characteristic makes possible an extremely reliable and simple visual check of all fastening devices of a plate belt, since neither the cup washer nor the end of the fastening bolt is completely concealed by regions of the link chain and/or plate. As soon as the bolt end of a fastening bolt protrudes beyond the other bolt end of the plate belt this is immediately recognizable. Checking of the bolt ends can obviously also take place by means of sensors, wherein only one sensor is required per row of bolt ends of a plate belt.

The checking of the bolt ends is particularly simple when these protrude from the side, which is remote from the plates, of the link chain or the chain link straps thereof. In order to achieve this, in the mounted state the fastening bolt preferably penetrates at least two mutually parallel chain link straps of the chain link to be connected with the plate.

Since a link chain for constructional reasons comprises at least two different groups of chain links which differ primarily in their width, the cup washer can be so arranged between the bolt head of the fastening bolt and the chain link strap of the link chain remote from the plate that the cup collar bears against the chain link strap of the respective chain link in the case of narrow chain links and the cup base ring bears against the chain link strap of the respective chain link in the case of wide chain links.

The link chains usually comprise only narrow and wide chain links, which are arranged in alternation with one another in succession and are connected together at the articulation points of the link chain. If the cup washers are so arranged in alternation at the link chain that the cup collar bears against the chain link strap of the respective chain link in the case of narrow chain links and the cup base ring bears against the chain link strap of the respective chain link in the case of wide chain links then, disregarding the axial play of the link chain, all bolt heads protrude to the same extent from the link chain.

In the simplest way, the plate can be fastened directly to the link chain if the fastening bolt penetrates a cheek, which faces the chain link, of the plate fastened to this chain link or protrudes into a bore of the plate fastened to this chain link. The bore can be, for example, a passage bore, a blind bore or a threaded blind bore. Further possibilities are grooves, slots, openings, passages and the like, which are formed at the cheek, so that the fastening bolt can penetrate the cheek.

A respective spacer, the thickness of which corresponds with the thickness of a chain link strap, can be arranged between the narrow chain links and the plates fastened thereto. As a result, plates of identical manufacture can be fastened not only to the wide chain links, but also to the narrow chain links.

A thread can be formed at the end of the fastening bolt opposite the bolt head, which thread is screwed into the threaded blind bore mentioned above or—if the fastening bolt penetrates the cheek of the plate—receives, for example, a screw nut. The best securing of releasable screw connections can be achieved if a largest possible extension length is present within the screw connection. Particularly advantageous in that regard are the fastening bolts penetrating the chain link straps of a chain link. In that case, the entire shank length of the fastening bolt present between the two outwardly disposed chain link straps of a chain link can be used as the extension length. In order that, however, the chain links on tightening of the fastening bolt are not laterally compressed at least one respective support sleeve, through the bore of which the fastening bolt is insertable, can be arranged between the two outwardly disposed chain link straps of the respective chain link.

In addition, for simplification of assembly the spacer described further above can be fastened by means of the support sleeve to the chain link in the case of narrow chain links.

In order to reduce friction during circulation of the plate belt each of the link chains can have guide rollers. These are preferably arranged at the traction means in the region of the articulation points. This has the advantage that the connecting bolts, which are employed at the articulation points, of the link chain can at the same time serve as guide roller axles. The guide rollers can be arranged between the chain link straps at the articulation points of the link chain. Obviously, each of the link chains can also have guide rollers which are arranged at the outer side, which is remote from the plates, of the chain links and thus laterally of the plate belt at the articulation points. As a result, damaged guide rollers in existing installations can be exchanged for new guide rollers without the link chain having to be demounted as is required in the case of link chains with guide rollers arranged between the chain links. In order to facilitate checking or monitoring of the fastening bolts the fastening bolts preferably project laterally beyond the guide rollers.

The fastening bolts protruding in lateral direction from the link chain or extending orthogonally to the conveying direction of the plate belt can be used for additional purposes. Since the bolt ends (bolt heads and the bolt ends opposite the bolt heads) of the fastening bolts are all in a line referred to the conveying direction the fastening bolts can also be used as guide elements. Various possibilities are available for that purpose. For example, a slide element with a low coefficient of sliding friction can be arranged at a bolt end of at least one fastening bolt. The bolt ends can obviously also be coated with, for example, a sliding coating or with a plastics material layer. A further possibility would be to let into the bolt head a roller ball protruding at the end face.

The plate belt, which is described in the preceding, with the fastening device according to the invention can obviously be used not only in new moving walkways. For example, an existing moving walkway can be modernized in that the existing plate belt is replaced by a plate belt according to the invention.

In addition, in a moving walkway with the plate belt according to the invention at least one monitoring sensor can be present by which the position of an end of a fastening bolt relative to the position of a chain link strap of the associated chain link and relative to the ends of the other fastening bolts can be detected. As a result, not only a damaged fastening device, but also the straightness of the plate belt can be detected at the same time. The position of the ends can, for example, be scanned optically and/or mechanically. All possible detecting devices such as, for example, CCD cameras, TOF cameras, light barriers, touch switches, laser scanners, inductive proximity switches and the like can be used as monitoring sensors. In addition, high-frequency antennae, by change in the field of which fastening bolts which are absent or which protrude too far can be detected, or an RFID reader, which detects missing RFID tags and thus missing fastening bolts having these RFID tags, can be used as monitoring sensors. In order to increase the contrast of the parts, which are to be detected, of the fastening device for the monitoring sensors reflective markings can additionally be arranged at the ends of the fastening bolts, at the chain link straps and/or at the cup washers. Turning of the fastening bolt relative to the chain link strap and/or cup washer of a fastening device could thereby be immediately detected. Obviously markings with codes, for example barcodes or matrix codes, are also usable, which, for example, can include the component characteristics of the fastening bolt, the batch number thereof and the like.

The number of monitoring sensors is preferably oriented to the number of rows of fastening devices and thus to the number of traction means of a plate belt. The sensor signal of the monitoring sensor can be compared in a monitoring unit with a target value or target state. The monitoring unit then supplies information, for example, to the control of the moving walkway or to the safety circuit of the moving walkway with regard to whether the plate belt may circulate or be braked or even blocked in order to prevent accidents.

DESCRIPTION OF THE DRAWINGS

The plate belt together with the fastening device according to the invention for connecting a plate with a link chain serving as traction means is explained in more detail in the following by way of examples and with reference to the drawings, in which.

DETAILED DESCRIPTION

Figure 1:
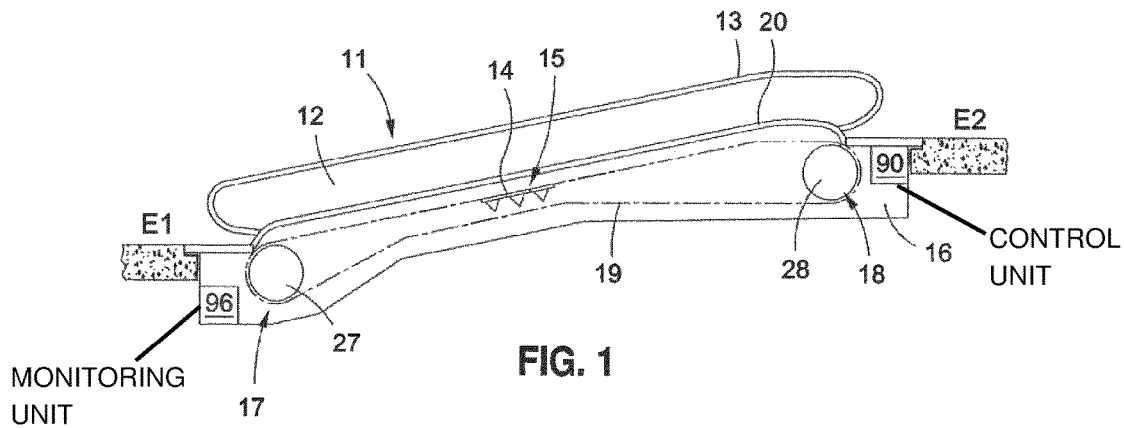
FIG. 1 shows, in schematic illustration, a moving walkway with a support structure and two deflecting regions, wherein guide rails are arranged in the support structure and an encircling plate belt is arranged between the deflecting regions.

FIG. 1 schematically shows in side view a moving walkway 11 which connects a first floor E1 with a second floor E2. The moving walkway 11 could obviously also connect together two places on the same floor, as is often encountered in, for example, lengthy corridors of airports. The moving walkway 11 comprises a support structure 16 or framework 16 with two deflecting regions 17, 18. Arranged in the deflecting regions are chainwheels 27, 28, between which a plate belt 15 is guided to circulate. The plate belt 15 comprises traction means 19 at which plates 14 are arranged. A handrail 13 is arranged at a balustrade 12. The balustrade 12 is connected at the lower end with the support structure 16 by means of a balustrade base 20. The drive (not illustrated) of the plate belt 15 is activated by means of a moving walkway control unit 90. In addition, arranged in the support structure 16 or framework 16 is a monitoring unit 96 connected with the monitoring sensors 95 illustrated in FIG. 2.

Figure 2:
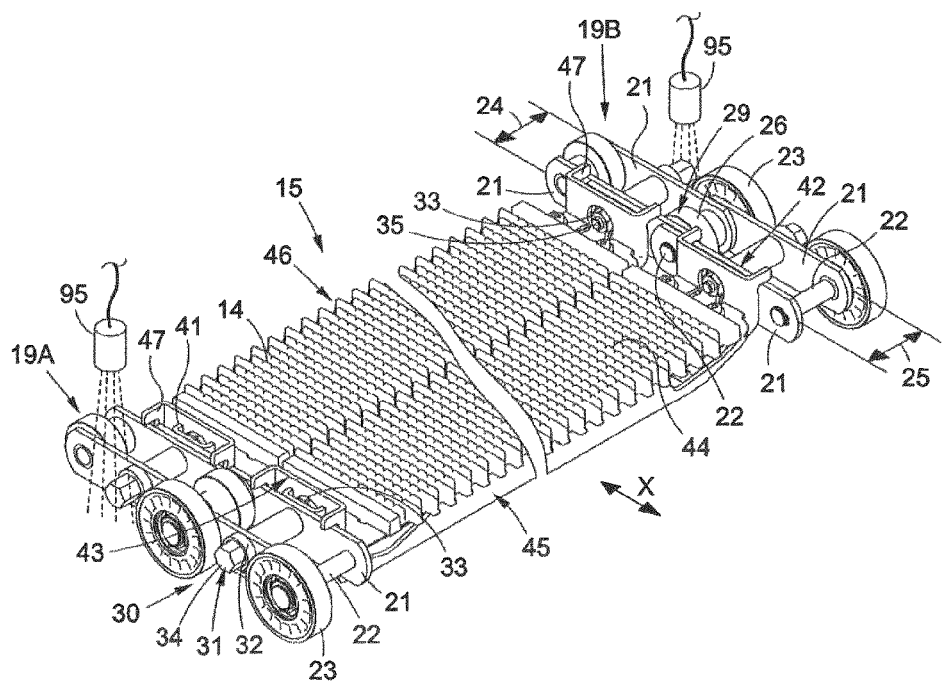
FIG. 2 shows, in three-dimensional illustration, a plate belt section of the plate belt schematically illustrated in FIG. 1, wherein two link chain sections, which serve as traction means, with guide rollers arranged laterally of the chain links and two plates arranged between the link chains are illustrated.

FIG. 2 shows a section in three-dimensional illustration of the plate belt 15 schematically illustrated in FIG. 1. The plate belt 15 comprises two traction means 19A, 19B. The illustrated traction means 19A, 19B are sections of two link chains 19A, 19B, the chain link straps 21 of which are connected together by means of chain bolts 22 to form two endless link chains 19A, 19B. Each two chain link straps 21 form either narrow chain links 24 or wide chain links 25. The chain bolts 22 serve not only as articulation points 22, but at the same time also as axles 22 for guide rollers 23. These guide rollers 23 are arranged laterally of the chain links 24, 25 and run on guide rails (not illustrated) arranged in the support structure 16 of the moving walkway 11 shown in FIG. 1. The guide rollers 23 and thus the traction means 19A, 19B are guided and supported against gravitational force by the guide rails so that the plate belt 15 does not sag between the two deflecting regions 17, 18.

The chain bolts 22 also serve as axles 22 for system rollers 26, which are respectively arranged between the two chain link straps 21 of the chain links 24, 25. These system rollers 26 can, for example, be made of metal and, as illustrated in FIG. 1, guided in the deflecting regions 17, 18 by way of chainwheels 27, 28, whereby the guide rollers 23 usually made of plastics material are preserved, since the guide surfaces 29 of the system rollers 26 are exposed to a high level of area pressure by the chainwheels 27, 28.

A plurality of plates 14 is arranged between the two traction means 19A, 19B, wherein for reasons of clarity only two plates 14 are illustrated in FIG. 2. A fastening device 30 which fixedly connects the link chain 19A, 19B with one of the plates 14 is arranged at each of the link chain straps 21 in each instance between two articulation points 22. In the present embodiment, each of the fastening devices 30 comprises a fastening bolt 31, a cup washer 32 and a screw nut 33. In order that the plate 14 is securely connected with the associated chain link 24, 25 the fastening bolt 31 penetrates the two chain link straps 21 of the chain link 24, 25 and a cheek 41 of the plate 14, in which case the bolt head 34 of the fastening bolt 31 protrudes laterally out of the chain link 24, 25. At the other end of the fastening bolt 31, a thread 35 which is better visible in FIGS. 4 and 5 and which receives the screw nut 33 is present. The cup washer 32 is arranged between the bolt head 34 and the laterally outwardly disposed chain link strap 21 of the associated chain link 24, 25. The illustrated bolt heads 34 of the fastening bolts 31 appear to have different lengths. In fact, however, all fastening bolts 31 used are of identical construction. The impression of bolt heads 34 of different lengths is due to the special installation of the cup washers 32, which are explained in more detail in connection with the description of FIGS. 4 and 5.

The plate 14 is bounded in its width by two parallel end faces 42, 43 extending in the intended movement direction X of the plate 14. A rectangular tread surface 44 extends between the two end faces 42, 43. The upper side of the tread surface 44 has a tread pattern in the form of a series of parallel ribs or webs extending from the front edge 45 to the rear edge 46 of the tread surface 44. The ribs thus similarly extend in the intended movement direction X of the plate 14. In addition, the ribs are dimensioned for engagement in comb structures (not illustrated) arranged in the deflection regions 17, 18 of the moving walkway 11.

At least one shoulder 47 is arranged at each of the two end faces 42, 43. The plates 14 can thereby be conveniently arranged between the two link chains 19A, 19B, since the shoulders 47 of the plates 14 arranged between the link chains 19A, 19B rest on the chain links 24, 25 and as a result the work for alignment of the plate 14 with the associated chain link 24, 25 until the fastening bolt 31 can be inserted through a recess or bore, which can be seen in FIG. 5, of the cheek 41 is substantially reduced. The fastened plates 14 thus connect the two link chains 19A, 19B together transversely to the intended movement direction X.

The fastening device 30 or the correct seat of the fastening bolts 31 can be monitored by means of a monitoring sensor 95 arranged in the moving walkway. The monitoring sensor 95 is fastened at a fixed location at a support structure (not illustrated) so that in the case of a full circulation of the plate belt 15 each fastening device 30 has moved past the monitoring sensor 95. For the monitoring, the position of an end of the fastening bolt 31, preferably the bolt head 34, is optically or mechanically scanned as illustrated. The minimum number of monitoring sensors 95 per moving walkway 11 is oriented towards the number of rows of fastening devices 30 and thus to the number of traction means 19A, 19B of a plate belt 15. The sensor signal of the monitoring sensor 95 can, for example, be compared in a monitoring unit 96 with a target value or target state. The monitoring unit 96 is preferably connected with a moving walkway control unit 90 (see FIG. 1) so that the plate belt 15 of the moving walkway 11 is stopped by this if the monitoring unit 96 has detected a loosened fastening device 30. The monitoring unit 96 can obviously also be integrated in the moving walkway control unit 90.

Figure 3:
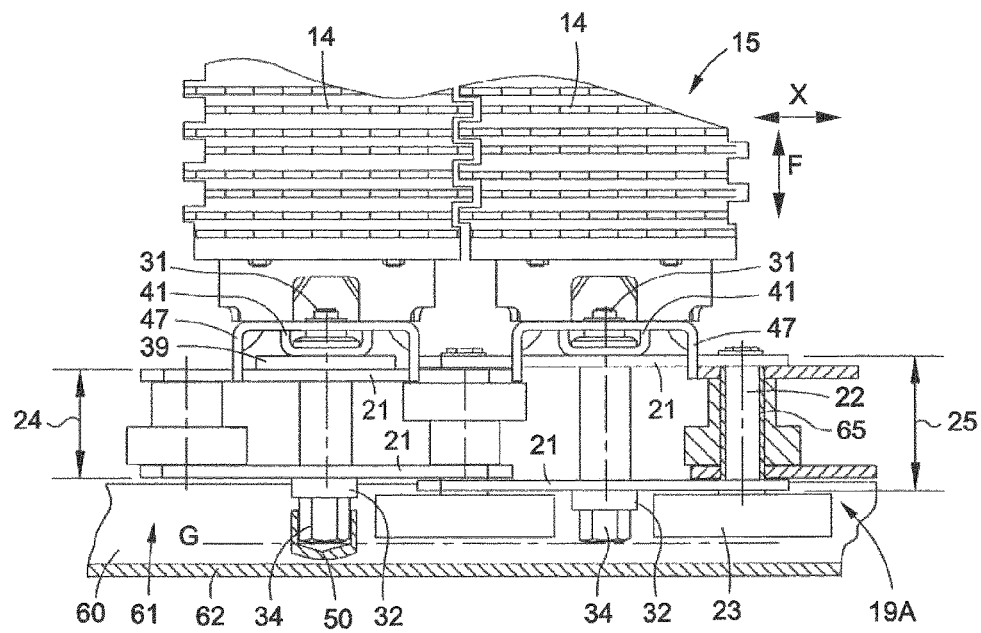
FIG. 3 shows, in plan view, a section of the plate belt illustrated in FIG. 2.

FIG. 3 shows in plan view a detail of the plate belt 15 illustrated in FIG. 2. The cheek 41 and the shoulder 47 of the plate 14 can be more easily seen by virtue of the plan view. In the case of wide chain links 25, in the mounted state the cheek 47 lies directly on the chain strap 21 of the link chain 19A facing it. In the case of the narrow chain links 24 in each instance a spacer 39 is arranged between the cheek 47 and the chain link strap 21 so that plates 14 of identical construction can be fastened to the narrow chain links 24 and the wide chain links 25.

As indicated by the dot-dashed line G, all bolt heads 34 of the fastening bolts 31 protrude to the same extent laterally from the link chain 19A or from the plate belt 15 and, in particular, regardless of whether the fastening bolts 31 are mounted at the narrow chain links 24 or wide chain links 25. This is achieved by the fact that the cup washer 32 is so arranged between the bolt head 34 of the fastening bolt 31 and the chain link strap 21 of the link chain 19A remote from the plate 14 that in the case of narrow chain links 24 the cup collar 51 illustrated in FIGS. 4 and 5 bears against the chain link strap 21 of the respective chain link 24, 25 and in the case of wide chain links 25 the cup base ring 52 bears against the chain link strap 21 of the respective chain link 24, 25.

In addition, it can be readily seen at the dot-dashed line G that the bolt heads 34 of the fastening bolts 31 laterally protrude beyond the guide rollers 23. The plate belt 15—the guide rollers 23 of which are supported on the guide rails 60 at least in the forward run loaded by the users—usually runs rectilinearly without problems. With increasing guidance work the bores in the chain link straps 21, the chain bolts 22 and the bearing bushes 65 in the link chains 19A, 19B are worn and different lengthenings between the left-hand link chain 19A and the right-hand link chain 19B can arise. These minimal differences are sufficient for the plates 14 arranged between the link chains 19A, 19B to no longer be arranged entirely orthogonally with respect to a movement direction X and running to the side thereby arises. This running to the side or skewed running results in a lateral force F which allows the guide rollers 23 to depart from the theoretical movement direction X thereof.

In order, in these cases, to guide the guide rollers 23 on the guide rail 60 or on the corresponding guide surface 61 the guide rail 60 has a guide flank 62 in movement direction X and thus in the length direction of the moving walkway 11. Since the bolt heads 34 laterally protrude beyond the guide rollers 23 they protrude at the guide flanks 62 before the guide rollers 23 contact the guide flanks 62. It is thereby possible to prevent the guide rollers 23, which are usually made of plastics material, from being damaged by the guide flank 62. The thus-arising sliding friction between the fastening bolt 31 and the guide flank 62 can be minimized if an end of the fastening bolt 31, for example the bolt head 34, is coated with a slide coating or, as illustrated, provided with a slide element 50. It is obviously not necessary for every bolt head 34 of a plate belt 15 to be provided with a slide element 50. In addition, obviously also other components of the moving walkway 11 can serve as guide flanks 62 for the fastening bolts 31, for example guide strips arranged at the guide rails 60 or in the support structure 16, a base plate of the balustrade base 20 illustrated in FIG. 1, and the like.

The assembly of the fastening device 30 and the elements of fastening bolt 31, cup washer 32 and screw nut 33 thereof are illustrated in detail in FIGS. 4 and 5, for which reason these are described conjunctively in the following and the same reference numerals are used.

Figure 4:
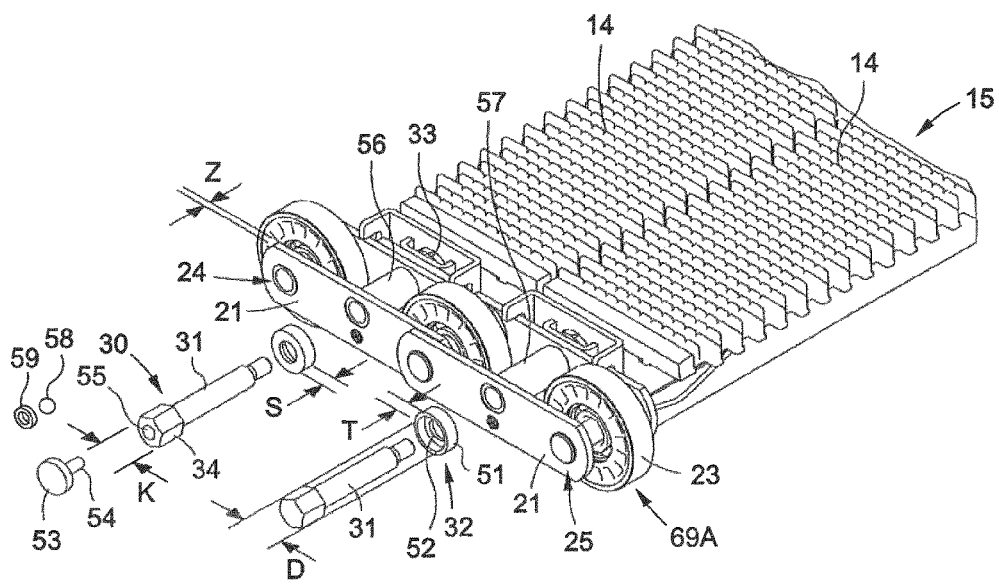
FIG. 4 shows, in three-dimensional illustration, the fixing of the plates, which are known from FIG. 3, by means of fastening devices to a link chain with guide rollers arranged between the chain link strap.

FIG. 4 shows in three-dimensional illustration the fixing of the plates 14 and fastening devices 30 known from FIG. 3 to a link chain 69A with guide rollers 23 arranged between the chain straps 21. Since this embodiment differs from the embodiment of FIGS. 2 and 3 only in the arrangement of the guide rollers 23 in the link chain 69A the same reference numerals are also used for the same parts. FIG. 5 additionally shows the plate belt 15 of FIG. 4 with sectioned link chain 69A and sectioned fastening devices 30 in three-dimensional illustration.

The correct installation of the cup washer 32 is readily apparent on the basis of FIG. 4. The cup washer has a cup base ring 52 adjoined by an encircling cup collar 51. The inner diameter D of the cup collar 51 is greater than the outer diameter K (in the present embodiment the corner dimension of the hexagonal bolt head 34) of the region of the fastening bolt 31 bearing against the cup base ring 52 in the mounted state. The inner height T of the cup collar 51 corresponds with the thickness Z of at least one chain link strap 21 of the chain link 24, 25. However, the inner height T should not be confused with the thickness S of the of cup washer 32. The thickness S corresponds with the sum of the inner height T and the cup base thickness P (see FIG. 5).

In order that all fastening bolts end on a line G (see FIG. 3), the cup washer 32 can be so arranged between the bolt head 34 of the fastening bolt 31 and the chain link strap 21 of the link chain 69A remote from the plate 14 that in the case of narrow chain links 24 the cup collar 51 bears against the chain link strap 21 of the respective chain link 24, 25 and in the case of wide chain links 25 the cup base ring 52 bears against the chain link strap 21 of the respective chain link 24, 25.

In addition, two further variants of embodiment of a slide element are illustrated in FIG. 4. The first of these variants comprises a mushroom-shaped slide element 53 with a pin 54, which pin 54 can be pressed into a bore 55 arranged at the end face of the bolt head 34. The second of these variants comprises a roller ball 58, which is, for example, a hard-chromium-plated steel ball, and an annular plug 59, which is, for example, made of brass. These two parts are so let into the bore 55 that the roller ball 58 slightly protrudes from the annular plug 59 and thus at the end out of the bolt head 34, but is trapped by the annular plug 59 in the bore 55. When the roller ball 58 now contacts a guide flank it rolls on this and constrains the plate belt 15 to roll along the guide flank.

Figure 5:
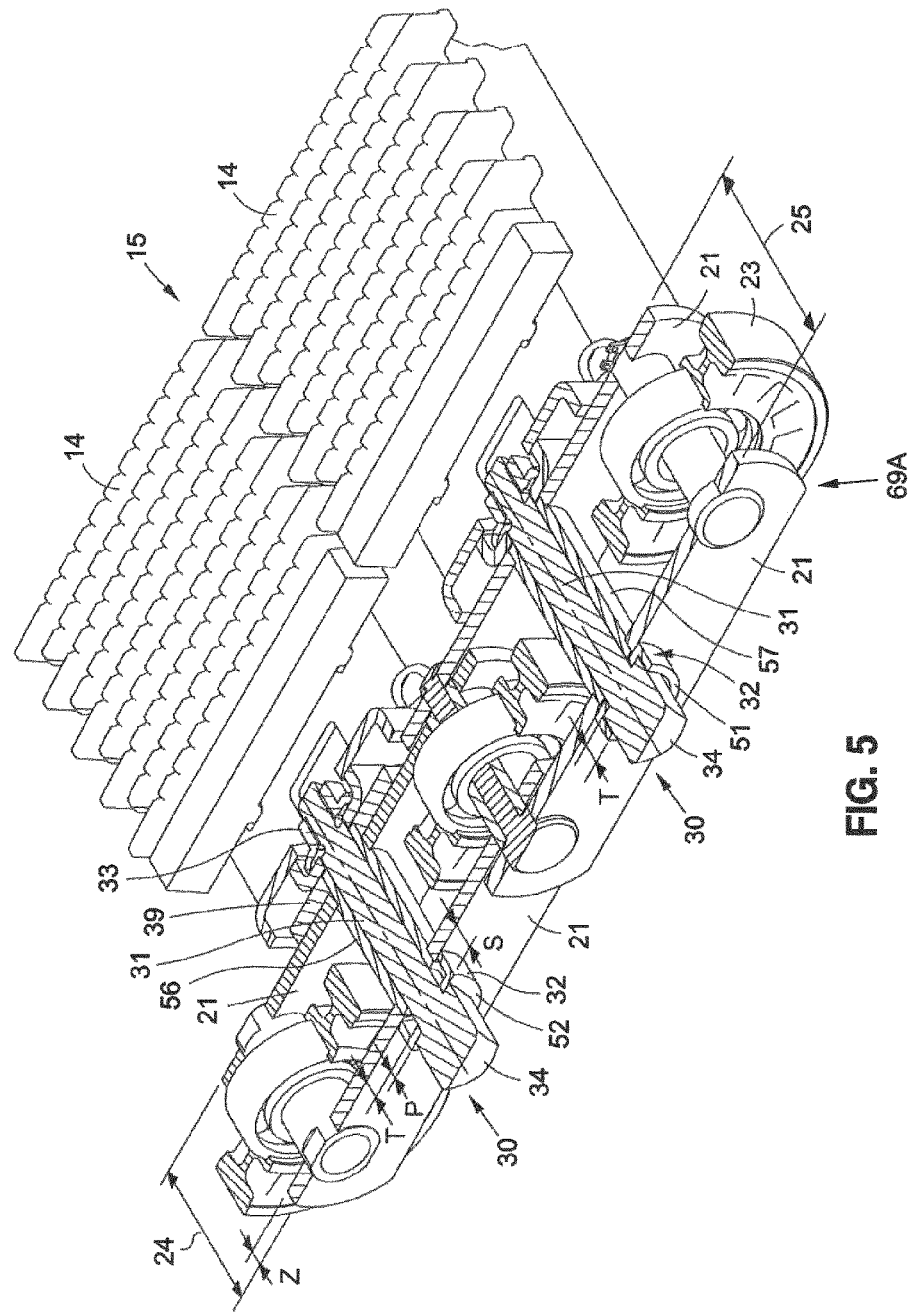
FIG. 5 shows the plate belt of FIG. 4 with a horizontally sectioned link chain in three-dimensional illustration.

As can be seen particularly in FIG. 5, the mounted fastening bolt 31 extends in a support sleeve 56, 57 which connects together the two chain link straps 21 of a chain link 24, 25. This support sleeve 56, 57 serves the purpose, when the screw nut 33 is tightened on the fastening bolt 31, that a biasing force can be generated and maintained within this screw connection or fastening device 30. Without the support sleeve 56, 57 the two chain link straps 21 would be pulled together in the middle and the chain link 24, 25 thereby plastically deformed. Since the link chain 69A has narrow chain links 24 and wide chain links 25, in the present example the support sleeves 56, 57 also have to have different lengths. The support sleeve 56 adapted to the narrow chain links 24 serves at the same time for fastening the spacer 39 at the narrow chain link 24, since it protrudes into the spacer.

Although the invention has been described by the illustration of specific embodiments it is obvious that numerous further variants of embodiment can be created with knowledge of the present invention, for example in that other types of link chains such as, for example, roller chains, toothed chains, flyer chains and the like are used as traction means. Obviously plates 14 can also be fastened by the fastening device 30 according to the invention to link chains with chain links of three different widths, insofar as the cup base thickness P characterized in FIG. 5 is the same as the thickness Z of a chain link strap 21. A possible sequence would then be that in the case of the widest chain links a fastening bolt 31 without a cup washer 32 is used, in the case of middle chain links a fastening bolt 31 with a cup washer 32—the cup base ring 51 of which bears against the chain link strap 21—is used and in the case of narrow chain links a fastening bolt 31 with a cup washer 32—the cup collar 52 of which bears against the chain link strap 21—is used.

Moreover, two traction means 19A, 19B, 69A arranged laterally of the plates 14 are not necessarily required. A plate belt 15 can also comprise only one traction means 19A, 19B, 69A which, with respect to the width of the plate belt 15, is preferably arranged centrally of the plates 14.

Even if from the aspect of production engineering and as illustrated in the embodiments a rotationally symmetrical design of the cup washer appears advantageous the cup washer does not necessarily have to be constructed to be circularly round. It can, for example, also have a cup base ring with a triangular, square, rectangular, polygonal or elliptical base surface, wherein the cup collar also does not necessarily have to run around exactly at the edges of this base surface of the cup base ring.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A plate belt of a moving walkway with a plurality of plates, which plates are arranged in succession in a movement direction and between two mutually parallel link chains formed by chain links of different width, comprising:
   each of the chain links of the link chains being connected with an associated one of the plates by at least one fastening device in a mounted state;

the at least one fastening device including a fastening bolt and a cup washer;

wherein the cup washer has a cup base ring and a cup collar encircling the cup base ring;

wherein an inner height of the cup collar corresponds with a thickness of a chain link strap of the chain link; and wherein an inner diameter of the cup collar is greater than an outer diameter of a region of the fastening bolt bearing against the cup base ring in the mounted state of the at least one fastening device.

2. The plate belt according to claim 1 wherein in the mounted state the fastening bolt penetrates the chain link strap and a mutually parallel another chain link strap of the chain link.

3. The plate belt according to claim 1 wherein the chain links of the link chains include a narrow chain link and a wide chain link, the narrow chain link being narrower in width than the wide chain link, and wherein the cup washer is arranged between a bolt head of the fastening bolt and the chain link strap, the chain link strap being remote from the associated one plate, such that the cup collar bears against the chain link strap if the chain link is the narrow chain link and the cup base ring bears against the chain link strap if the chain link is the wide chain link.

4. The plate belt according to claim 1 wherein the chain links of the link chains are formed by alternation of a narrow chain link and a wide chain link, the narrow chain link being narrower in width than the wide chain link, and the cup washers are arranged in alternation such that the cup collar bears against the chain link strap of the narrow chain link and the cup base ring bears against the chain link strap of the wide chain link.

5. The plate belt according to claim 1 the fastening bolt penetrates a cheek of the associated one plate, which cheek faces the chain link, or penetrates into a bore of the associated one plate.

6. The plate belt according to claim 1 including a spacer, having a thickness which corresponds with the thickness of the chain link strap, arranged between the chain link and the associated one plate.

7. The plate belt according to claim 1 including a support sleeve, having a bore through which the fastening bolt is inserted, is arranged between the chain link strap and another chain link strap of the chain link.

8. The plate belt according to claim 7 including a spacer, having a thickness which corresponds with the thickness of the chain link strap, arranged between the chain link and the associated one plate and wherein the spacer is fastened to the chain link by the support sleeve.

9. The plate belt according to claim 1 wherein each of the link chains includes guide rollers arranged between the pairs of the chain link strap at articulation points of the link chain.

10. The plate belt according to claim 1 wherein each of the link chains includes guide rollers arranged at an outer side, which outer side is remote from the plates, of the chain links at articulation points, wherein the fastening bolt projects laterally beyond the guide rollers.

11. The plate belt according to claim 1 including a slide element having a low coefficient of slide friction is arranged at a bolt end of the fastening bolt.

12. A moving walkway including the plate belt according to claim 1.

13. A method of monitoring the plate belt of the moving walkway according to claim 1 comprising the steps of:
providing at least one monitoring sensor at a position adjacent one of the link chains;
detecting the fastening bolt as the one link chain moves past the at least one monitoring sensor; and
generating a sensor signal in response to the detecting and comparing the sensor signal with a target value in a monitoring unit to control the moving walkway.

14. The method according to claim 13 wherein the at least one monitoring sensor is one of a CCD camera, a TOF camera, a light barrier, a touch switch, a laser scanner, an inductive proximity switch, a high-frequency antenna and an RFID reader.

15. A method of modernization of an existing moving walkway having an existing plate belt comprising the steps of:
replacing the existing plate belt with a new plate belt, the new plate belt having a plurality of plates, which plates are arranged in succession in a movement direction and between two mutually parallel link chains formed by chain links of different width;
providing each of the chain links of the link chains with a connection with an associated one of the plates by at least one fastening device in a mounted state;
wherein the at least one fastening device includes a fastening bolt and a cup washer;
wherein the cup washer has a cup base ring and a cup collar encircling the cup base ring;
wherein an inner height of the cup collar corresponds with a thickness of a chain link strap of the chain link; and
wherein an inner diameter of the cup collar is greater than an outer diameter of a region of the fastening bolt bearing against the cup base ring in the mounted state of the at least one fastening device.

* * * * *